No. 772,137. PATENTED OCT. 11, 1904.
W. C. DURYEA.
GRAIN BINDER.
APPLICATION FILED APR. 14, 1902.
MODEL. 4 SHEETS—SHEET 3.
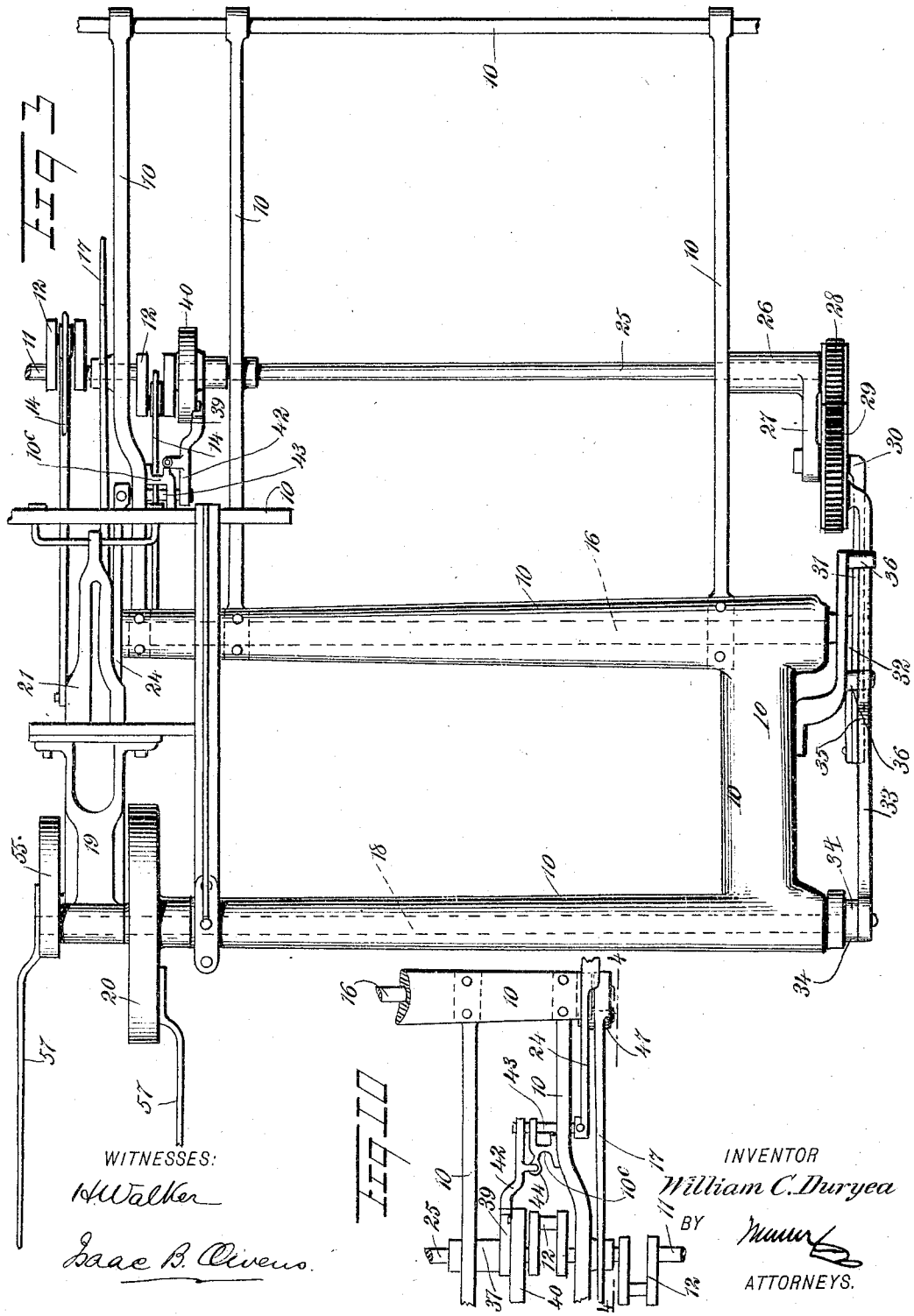
WITNESSES:
H. Walker
Isaac B. Olivens.
INVENTOR
William C. Duryea
BY
ATTORNEYS.

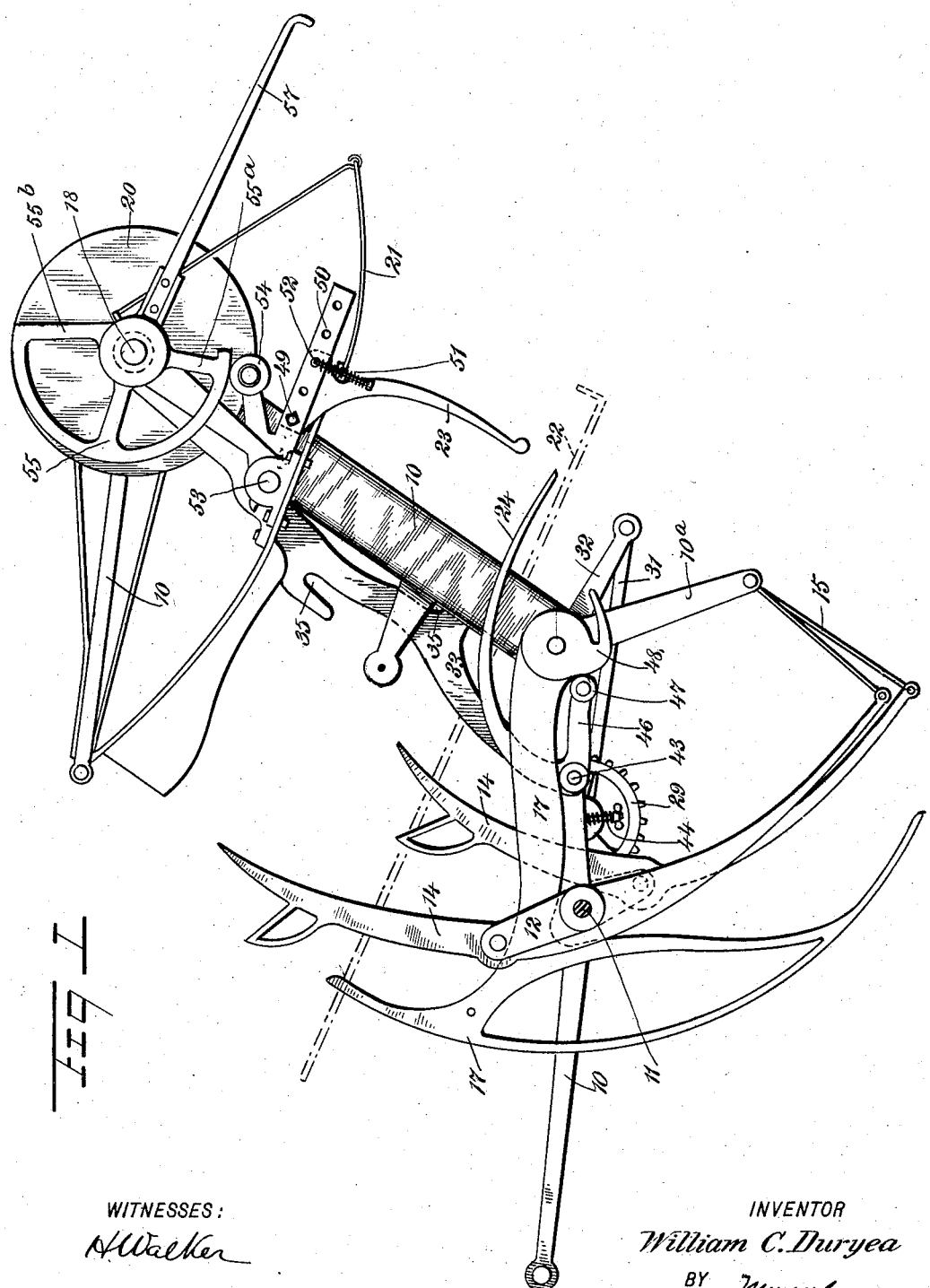

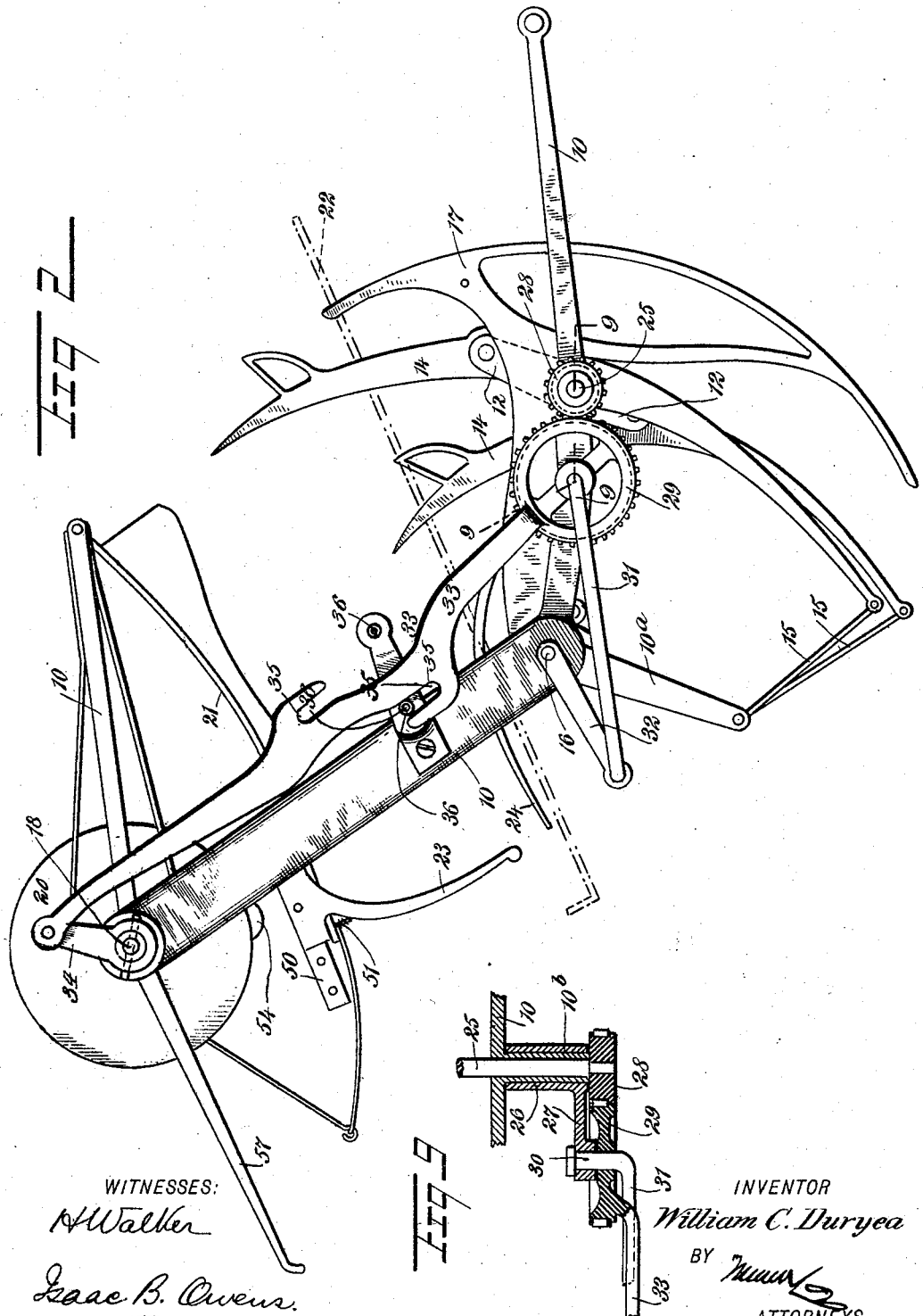

No. 772,137. PATENTED OCT. 11, 1904.
W. C. DURYEA.
GRAIN BINDER.
APPLICATION FILED APR. 14, 1902.
MODEL. 4 SHEETS—SHEET 4.
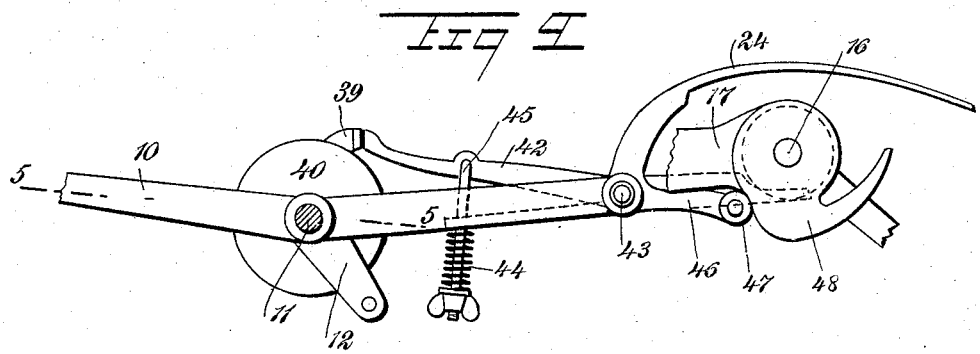
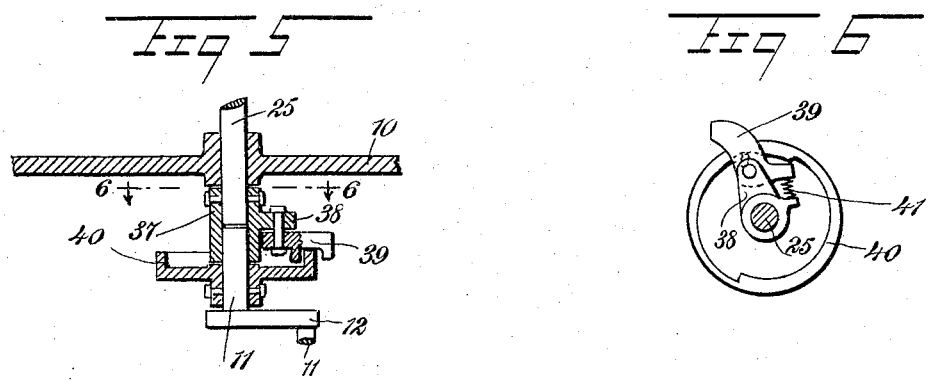
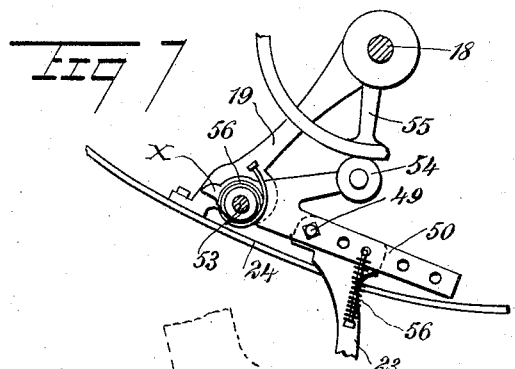
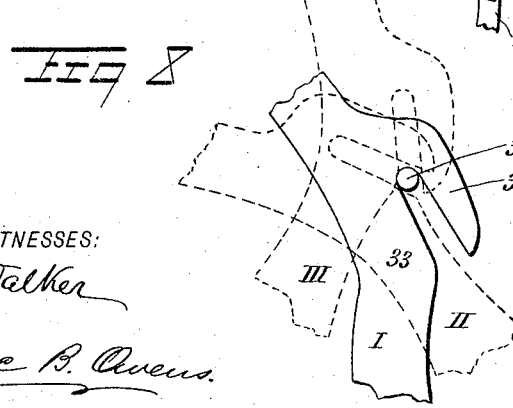
WITNESSES:
H. W. Walker
Isaac B. Owens
INVENTOR
William C. Duryea
BY Munn
ATTORNEYS.

No. 772,137.

Patented October 11, 1904.

UNITED STATES PATENT OFFICE.

WILLIAM C. DURYEA, OF BLAWENBURG, NEW JERSEY.

GRAIN-BINDER.

SPECIFICATION forming part of Letters Patent No. 772,137, dated October 11, 1904.

Application filed April 14, 1902. Serial No. 102,794. (Model.)

*To all whom it may concern:*

Be it known that I, WILLIAM C. DURYEA, a citizen of the United States, and a resident of Blawenburg, in the county of Somerset and State of New Jersey, have invented a new and Improved Grain-Binder, of which the following is a full, clear, and exact description.

The object of this invention is to effect certain improvements in the mechanism for actuating the stop and ejector arms of grain-binding apparatus.

A further object is to construct the trip devices so that they will be more certain in operation than heretofore.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a right side elevation of the apparatus. Fig. 2 is a left side elevation thereof. Fig. 3 is a plan view of the invention. Fig. 4 is a fragmentary elevation of the trip-arm, showing its connection with the clutch, said view looking from the line 4 4 of Fig. 10. Fig. 5 is a sectional view of the clutch on the line 5 5 of Fig. 4. Fig. 6 is an elevational section on the line 6 6 in Fig. 5. Fig. 7 is a fragmentary elevation showing the manner of mounting the stop-arm. Fig. 8 is a diagrammatic view illustrating the operation of the connecting-rod between the drive-shaft and the knotter-shaft. Fig. 9 is a detail section on the line 9 9 of Fig. 2, showing the manner of mounting the sun-and-planet gearing for driving the knotter-shaft; and Fig. 10 is a fragmentary plan view showing the trip-arm and its coaction with the clutch.

The rigid parts of the framing of the grain-binding mechanism are indicated by the numeral 10 and may be of the usual or any desired construction. These will not be specifically described, since they form no part of the present invention and are fully understood by persons skilled in the art.

11 indicates the drive-shaft, having cranks 12 thereon, to which the packer-arms 14 are connected and by which they are driven in the usual manner. 15 indicates the links connecting the packer-arms with the arms $10^a$ of the frame. 16 indicates the needle-shaft, and 17 the needle, which is carried thereon in the usual manner. 18 indicates the knotter-shaft, 19 the knotter-housing, and 20 the usual gear which drives the knotter; 21, the breastplate, and the dotted line 22 indicates the deck of the binder. All of these parts are of the usual construction and well known in the art.

23 indicates the stop-arm, and 24 the trip-arm, these parts being positioned in the usual manner and serving the usual function, but their construction and arrangement with the other elements differ according to my invention in a manner which will now be described.

$10^b$ indicates (see Fig. 9) a boss formed on the right-hand side of the binder-frame and disposed transversely, this boss carrying loosely the shaft 25, which forms a continuation of the drive-shaft 11 and imparts movement to the needle and knotter shafts and their allied parts. Mounted to turn loosely around the boss $10^b$ is a sleeve 26, and this sleeve carries an arm 27. The end of the shaft 25 projects beyond the boss $10^b$ and carries a pinion 28, which is in mesh with a planetary gear 29. This gear 29 is mounted to revolve on the transversely-turned end 30 of a rod 31, connected by a crank 32 with the needle-shaft 16. The transversely-turned end 30 of the rod 31 passes loosely through the planetary gear 29 and is carried loosely in the end of the arm 27. Fastened rigidly to or formed integral with the planetary gear 29 is an arm 33, connected to the knotter-shaft through the medium of a crank 34 on said shaft. The arm 33 has at opposite edges hooks 35, which are placed out of transverse alinement with each other and are adapted respectively to engage with studs 36 on the binder-frame, this engagement being alternate—that is to say, one hook engaging its corresponding stud and then disengaging it, while the other hook begins its engagement with the corresponding stud. These hooks and studs form temporary fulcra for the rod 33, which during these periods is transformed into a lever. Fig. 8 illustrates diagrammatically the rolling action of the arm and the Roman numerals I II III on this view show the successive positions taken, from which it will be seen that the rocking movement begins with the hook fully engaged with the stud and during the rocking movement the hook is gradually disengaging the stud. Now as the shaft 25 turns and drives the gear 28, owing to the arrangement of the parts 26, 27, 29, and 33, the arm 27 and gear 29 are caused to sweep around the gear 28. This imparts a rotary motion to the knotter-shaft and a rocking motion to the needle-shaft. It will be observed that the rod 31 serves not only to drive the needle-shaft, but as a center for the planetary gear 29. As the arm 33 moves upward it engages the lower hook 35 with the corresponding stud 36, and the arm then rocks around this stud as a lever. As the arm moves down the upper hook 35 engages the corresponding stud and the arm again rocks as a lever. By this means I am enabled to get the necessary force for driving the knotter-shaft and to turn the crank 34 past the two dead-centers, which it necessarily takes with respect to the knotter-shaft and the driving force. It of course will be understood that the parts 35 and 36 must be carefully positioned relatively to each other, so that engagement at the proper time will take place. This mechanism provides a direct and powerful means for driving the knotter-shaft and dispenses with the long train of gears and complicated clutch common to this part of binders as usually constructed.

As shown best in Figs. 3, 5, and 10, the adjacent ends of the shafts 11 and 25 closely approach and are adapted to be connected by a modification of the Appleby clutch, which comprises a sleeve 37, keyed to the shaft 25 and having a radially-projected stud 38, carrying a dog 39, which coacts with the disk member 40, keyed on the drive-shaft 11. The dog 39 projects outward beyond the clutch-disk 40 and is thrown into active position by means of a spring 41. (See Fig. 6.) 42 indicates a stop-arm which is adapted normally to engage the dog 39 and hold it inactive contrary to the action of the spring 41. The engagement of the parts 39 and 42 is best shown in Fig. 4. When these parts are disengaged, the spring 41 throws the dog 39 into engagement with the disk 40, and the shafts 11 and 45 are connected. The stop-arm 42 is mounted on a short transverse shaft 43, which itself is carried in a part of the frame 10 and in a bracket 10$^c$, fastened to said frame part. 44 indicates a spring bearing between this bracket 10$^d$ and stop-arm 42 through the medium of a rod 45, to which the spring and stop-arm are connected, and this spring 44 tends normally to hold the arm 42 in active position—i. e., engagement with the dog. To the outer end of the shaft 43 the trip-arm 24, before mentioned, is fastened, and at this point on the rod 43 is also fastened a short arm 46, which projects under the needle and carries a roller 47, adapted to engage with a tail-cam 48 on the butt of the needle. Now when the pressure of the gavel on the trip-arm becomes sufficiently great it will throw the trip-arm down, and it will also raise the arm 42, thus permitting the spring 41 to engage together the members of the clutch. The shaft 11 turns continuously, working the packer-arms in the usual manner, and when the members of the clutch are engaged the shaft 25 turns. This shaft by means of the gearing before described immediately starts the action of the needle and the knotter shafts, and the instant that the needle begins to move it rides the tail-cam 48 under the roller 47, and thus it holds the arm 42 raised through the medium of the arm 46. The needle moves up around the gavel during this period and returns, the arm 42 being held inactive until the needle comes to rest at the end of the movement, whereupon the cam 48 runs off of the roller 47, and the spring 48 immediately throws down the arm 42, thus breaking the connection of the clutch members and stopping the movement of the needle and knotter shafts.

The stop-arm 23 is pivotally mounted at the point 49 on an elbow-lever 50, and a stout spring connection is effected between these parts 23 and 50 by means of a spring 51 and rod 52. This allows the stop-arm 23 to yield slightly with respect to the elbow-lever 50. The elbow-lever 50 is mounted to turn around the center 53, and its other arm carries a roller 54, which engages a cam 55 on the knotter-shaft. This cam, as best shown in Fig. 1, is approximately half-circular, and it gradually increases in radius from the end 55$^a$ to the end 55$^b$. Assuming the parts to be in the position shown in Fig. 1, as the knotter-shaft 18 turns it drives the cam 55, and the increase of radius of this cam slightly presses down the elbow-lever 50, and consequently the stop-arm. This causes the stop-arm to assist in pressing the gavel, said arm moving contrary to the advancing needle, and thus the parts hold the gavel snug during the knotting operation. Finally, when the cam 55 runs off of the roller 54 the stop-arm is released and is allowed to swing, with the elbow-lever, upward, so as to permit the bundle to be ejected.

56 indicates a coil or other spring which is connected to the lever 50 and tends to throw the same upward, (see Fig. 7,) so that the instant the cam 55 releases the elbow-lever it will move with the stop-arm into inactive position.

57 indicates the two ejector-arms. These arms are carried, respectively, on the knotter-gear 20 and the cam 55 and are in transverse alinement, as the drawings indicate. They are so positioned that immediately after the release of the stop-arm the ejector-arms will sweep downward, engaging the bundle and throwing it from the machine.

The general operation of the apparatus may be traced as follows: The drive-shaft 11 turns continuously, and the packer-arms are working steadily to force the grain. When the pressure on the trip-arm 24 becomes sufficient, the trip-arm is depressed and the clutch members are allowed to become active, whereupon the shaft 25 turns. This movement of the shaft causes the planetary gear 29 to be swept around the gear 28, and the proper movements are thereby imparted to the needle and knotter shafts. The needle moves up, and then the cam 48 holds the arm 42 inactive. As the needle moves up the cam 55 causes the stop-arm 23 to move slightly toward the needle. During this period the knotter mechanism is active and the knot is tied. Then the cam 55 runs off of the roller 54, and the stop-arm moves upward under the action of the spring 56, whereupon the ejector-arms 57 move against the bundle and sweep it from the machine. Meanwhile the needle is falling back to its inactive position, and immediately upon the assumption of this position the arm 42 descends and throws back the dog 39, thus stopping the movement of the shaft 25.

The knotter and its operative gear may be of any desired construction and forms no part of the present invention, for which reason I have not here illustrated it. The same is true of the various frame parts and the other adjacent parts of the binder mechanism, including the deck, the breastplate, and such parts, all of which are preferably the same as those usually employed.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. In a grain-binder, the combination of an elbow-lever, a stop-arm yieldingly carried on one arm thereof, and a cam on the knotter-shaft and working against the other arm of the elbow-lever, said cam being of slightly-increasing radius.

2. In a grain-binder, the combination of an elbow-lever, a stop-arm pivotally mounted on one arm thereof, a spring connection between the stop-arm and the arm of the elbow-lever to which the stop-arm is pivoted and a cam working against the other arm of the elbow-lever, said cam being of slightly-increasing radius, and being fastened on the knotter-shaft to turn therewith.

3. In a grain-binder, the combination of an elbow-lever, a stop-arm carried thereby, a spring tending to throw the elbow-lever and stop-arm upward into inactive position, and an approximately semicircular cam on the knotter-shaft and bearing on the elbow-lever and being of slightly-increasing radius, for the purpose specified.

4. In a grain-binder, the combination with the gavel forming and binding mechanism, of a stop-arm, a support upon which the stop-arm is carried, a cam on the knotter-shaft and engaging the said support during a portion of the revolution of the knotter-shaft, and an ejector-arm carried by the knotter-shaft, and serving to engage the gavel when the support is disengaged from the said cam.

5. In a grain-binder, the combination with the gavel forming and binding mechanism, of a movable and spring-pressed support, a yieldingly-mounted stop-arm carried by the support, a cam on the knotter-shaft engaging the support during a portion of the revolution of the knotter-shaft, and an ejector-arm carried by the knotter-shaft and serving to engage the gavel when the support is disengaged from the said cam.

6. In a grain-binder, the combination with gavel forming and binding mechanism, of a pivoted and spring-pressed elbow-lever, a stop-arm pivoted on one arm of the elbow-lever, a spring connection between the stop-arm and the arm of the elbow-lever carrying the stop-arm, a cam on the knotter-shaft and engaging the other arm of the elbow-lever during a portion of the revolution of the knotter-shaft, and an ejector-arm carried by the knotter-shaft and adapted to engage the gavel when the elbow-lever is disengaged from the said cam.

7. In a grain-binder, the combination with mechanism for forming and binding the gavel, of a clutch controlling the movements of the knotter and needle shafts, a rock-shaft having oppositely-projecting arms, one of which normally engages a member of the clutch to hold the clutch inactive, a trip-arm mounted on the rock-shaft, and a cam on the needle-shaft and engaging the other arm of the said rock-shaft, to hold the stop-arm out of engagement with the clutch member, said cam having a tail-like portion projecting tangentially therefrom.

8. In a grain-binder, the combination with a drive-shaft formed of sections, one of which continuously revolves, a clutch connecting the sections, said clutch having a pivoted and spring-pressed member, a rock-shaft, a trip-arm on the rock-shaft, a spring-pressed stop-arm on the rock-shaft and normally engaging the pivoted member of the clutch, a short arm also on the rock-shaft and projecting under the needle, and a cam on the butt of the needle and engaging the said short arm, said cam having a tail-like portion projecting tangentially therefrom.

9. In a grain-binder, the combination of the knotter-shaft, a cam thereon, a pivoted and spring-pressed elbow-lever having one member engaging the said cam, a stop-arm pivoted to the elbow-lever, and spring connection between the stop-arm and the elbow-lever.

10. In a grain-binder, the combination of a drive-shaft formed of sections, a clutch for connecting the sections, a spring-pressed stop-arm for holding the clutch inactive, a trip-arm connected with the stop-arm, a cam on the needle-shaft for holding the stop-arm in an inactive position, a cam on the knotter-shaft, a pivoted and spring-pressed elbow-lever having one member engaging the cam, and a yieldingly-mounted stop-arm carried by the said lever.

11. In a grain-binder, the combination of a drive-shaft formed in sections, a clutch connecting the sections of the shaft, an arm normally engaging a member of the clutch to hold the clutch inactive, a trip-arm, a connection between the said arm and trip-arm for operating the former from the latter to disengage it from the clutch member, a needle-shaft, a cam on the needle-shaft for holding the said arm disengaged from the clutch member, a knotter-shaft, a stop-arm, a support for the stop-arm, a cam on the knotter-shaft for engaging the said support, and means for operating the needle and knotter shafts from the drive-shaft.

12. In a grain-binder, the combination of a drive-shaft formed in sections, a clutch connecting the shafts of the sections, a pivoted and spring-pressed arm normally engaging a member of the clutch, a trip-arm connected with and operating the first-named arm to disengage it from the clutch member, a needle-shaft, a cam on the butt of the needle for holding the said arm disengaged from the clutch member, a knotter-shaft, a stop-arm, a support for the stop-arm, a cam on the knotter-shaft for operating the said support, an ejector-arm carried by the knotter-shaft, and means for operating the needle and knotter shafts from the drive-shaft.

In testimony whereof I have signed my name to this specification in the presence of two subscribing witnesses.

WILLIAM C. DURYEA.

Witnesses:
JAMES N. VANZANDT,
JOHN E. HEIGHT.